US007229549B2

(12) United States Patent
Grimwood

(10) Patent No.: US 7,229,549 B2
(45) Date of Patent: Jun. 12, 2007

(54) CONTROL AND CLASSIFICATION OF LIQUIDS IN SEPARATING PROCESSES

(75) Inventor: Geoffrey Clive Grimwood, Holmfirth (GB)

(73) Assignee: Thomas Broadbent & Sons, Huddersfield (GB)

( * ) Notice: Subject to any disclaimer, the term of this patent is extended or adjusted under 35 U.S.C. 154(b) by 310 days.

(21) Appl. No.: 10/676,960

(22) Filed: Sep. 30, 2003

(65) Prior Publication Data

US 2004/0065603 A1 Apr. 8, 2004

(30) Foreign Application Priority Data

Oct. 3, 2002 (GB) ................................ 0222853.4

(51) Int. Cl.
*B01D 17/12* (2006.01)

(52) U.S. Cl. ........................ 210/85; 210/143; 210/149; 210/369; 210/391

(58) Field of Classification Search .................. 210/85, 210/86, 143, 360.1, 739, 787, 149, 369, 391; 494/1, 10, 36, 37, 60
See application file for complete search history.

(56) References Cited

U.S. PATENT DOCUMENTS 4,229,298 A * 10/1980 Bange ........................ 210/787
6,063,292 A * 5/2000 Leung ........................ 210/739
6,143,183 A * 11/2000 Wardwell et al. ........... 210/739
6,213,928 B1 * 4/2001 Joshi et al. ................... 494/10

FOREIGN PATENT DOCUMENTS

| | | |
|---|---|---|
| DE | 3925198 A | 7/1989 |
| EP | 0049089 | 4/1982 |
| GB | 538444 | 1/1940 |
| GB | 653126 | 7/1948 |
| GB | 720919 | 4/1953 |
| GB | 770615 | 6/1955 |
| SU | 518234 A | 10/1974 |

OTHER PUBLICATIONS

U.K. Patent Office: Search Report under Section 17.
WPI Abstract Accession No. 1977-24695 & SU-518234 Groznensk Petr Auto.
WPI Abstract Accession No. 1970-084603 & DE-3925198 Krauss-Maffei AG.

* cited by examiner

*Primary Examiner*—Joseph Drodge
(74) *Attorney, Agent, or Firm*—Myers Dawes Andras & Sherman LLP; Joseph C. Andras

(57) ABSTRACT

An apparatus for the separation of solids and liquids includes a perforated rotary basket arranged for rotation within a fixed outer casing, a washing liquid supply system for providing washing liquid to the interior of the basket and its contents, and a transducer device for establishing a control signal representative of the state of liquids centrifugally expelled from the basket when such liquids impinge on an inner surface of the fixed outer casing. The transducer is set in or on the inner wall of the outer casing for monitoring the conductance of liquids within.

12 Claims, 7 Drawing Sheets

CONTROL AND CLASSIFICATION OF LIQUIDS IN SEPARATING PROCESSES

CROSS REFERENCE TO RELATED APPLICATION

The present application is related to and takes priority from U.K. Patent Application No. 0222853.4, filed Oct. 3, 2002, commonly owned by the assignee of the present application, the entire contents of which are expressly incorporated herein by reference.

FIELD OF THE INVENTION

The present invention relates to the control and classification of liquids in separating processes.

BACKGROUND OF THE INVENTION

When a centrifuge or similar apparatus is implemented to separate a mother liquid from solids, it is desired in a multitude of processes to wash the solids retained in the centrifuge or similar apparatus to remove either the vestiges remaining of the mother liquid and/or to purify the solids retained. This is achieved by introducing another liquid, a "wash liquid", into the centrifuge after a quantity of the mother liquid has been removed by the centrifuge.

In using a centrifuge or similar apparatus in a process in which the solids are soluble in the wash liquid (referred to herein as Class X), the improved purification of the solids must be offset by the loss of the dissolved solids, the reduction in separation efficiency and the necessary process to separate the wash liquid from the separated mother liquid and recover any dissolved solids. An example of this situation is that of separating massecuite into sugar crystals and molasses. Whilst retaining the sugar crystals in the basket, the separated molasses and wash liquid require a further separation with minimal intermixing, to be processed in separate streams, the wash liquid being applied after the bulk of the molasses has been separated to wash the crystals to the required purity levels.

In a process involving a centrifuge or similar apparatus in which the solids are insoluble in a wash liquid (referred to herein as Class Y), the solids, after separation, may be washed to remove further mother liquid from its surfaces. The extent of the wash must be offset against the additional loading of the further separation stage that must be provided to remove the contaminants from the excess liquid used to wash the solids. An example of this situation is that of producing gypsum in flue gas desulphurisation processes. Washing during the centrifuge part of this process reduces the chloride contamination of the solids to produce high grade gypsum suitable for wall board manufacture. The mother and the wash liquids are mixed and reprocessed as an effluent.

The use of wash liquid in excess of the minimum required is known as "overwashing". Overwashing is detrimental to the separation process and results in reduced separating efficiency, increased process cycle times, excess wash liquid usage, excess dissolution of solids, increased load on secondary effluent separating process or combinations of these.

Thus, the amount of wash liquid used affects the efficiency and economy of implementing a centrifuge.

It is known to seek to control overwashing by monitoring the liquid state as it leaves the centrifuge case. FIG. 1 of the accompanying drawings shows a typical industrial centrifuge comprising a perforated cylindrical basket/drum 10 which has a perforated outer surface and is rotatable about a vertical axis 12 on a motor driven shaft 14. The perforated basket 10 has a screen 15 on its cylindrical inner surface and is contained within a cylindrical outer casing 16 having an outlet pipe 18 at its lower end for leading off liquids centrifugally separated from solids 20. A pipe 22 enables a wash liquid to be sprayed onto the solids 20 in the basket retained by the screen 15.

A measurement of the state of the wash liquid is made at a measurement location 19 in the outlet pipe 18.

The flow of wash liquid through the centrifuge—from the stationary wash pipe 22 to the rotating basket 10, through the solids 20, basket perforations and screen 15 to flow down the stationary casing 16 inner surface 24 to the casing outlet 18—is complex. It varies with the liquid viscosities, screen type, basket perforations pattern, casing dimensions, centrifugal speed, windage and outlet position, all of which affect the flow rate. Of concern here is the liquid flow as it leaves the rotating basket and spirals down the inner surface 24 of the casing 16.

In an industrial centrifuge, the time period for the wash liquid to reach the outlet pipe from the basket perforations is typically between 5 and 30 seconds. Thus any measurement of the state of the wash liquid immediately after the point of contact with the solids will be delayed by at least this time during which overwashing may have occurred. Thus a flow time of 20 seconds from perforations/screen to the outlet to provide a minimum (ideal) solids wash time of 20 seconds requires 40 seconds total wash time and results in a 100% overwashing. These weaknesses are most marked on large centrifuges processing viscous liquids.

If the flow of the wash liquid is set at a fixed time to ensure a full wash under idealized conditions of maximum process throughput and minimum available wash liquid flow rate, then further overwashing will occur as the process parameters vary from the ideal.

Overwashing, a weakness of all known existing systems of wash liquid control, is detrimental to the separation process and, depending on the application, may result in one or more of:

(a) reduced separation efficiency, (b) increased process cycle times, (c) excess wash liquid usage, (d) excess dissolution of solids and (e) increased load on secondary effluent separating processes.

Thus, the present state of the art measuring the liquid condition at the outlet (18) requires the full flow of the liquid at the outlet pipe measuring point (19), and gives the required measurement signal only after the liquid has traveled from the perforations/screen to the outlet, a delay ranging from 5 to 30 seconds. Setting a fixed wash time of flow for a correct wash at maximum basket fill level and minimum wash flow rate results in overwashing on all throughputs including the maximum. These weaknesses will be most marked on large centrifuges processing viscous liquids (e.g. in Class X, sugar losses of 10% of the factory sugar output have been recorded by overwashing during centrifuging with fixed time wash control).

SUMMARY OF THE INVENTION

In accordance with a first aspect of the present invention there is provided an apparatus for the separation of solids and liquids comprising a perforated rotary basket arranged for rotation within a fixed outer casing, a washing liquid supply means for providing washing liquid to the interior of the basket and its contents, and a device for establishing a control signal representative of the state of liquids centrifugally expelled from the basket when such liquids impinge on an inner surface of said fixed outer casing.

Preferably, the device comprises one or more transducers for monitoring the electrical conductance of liquids flowing thereover in the outer casing, to enable rapid generation of the control signal. Advantageously, said one or more transducers are disposed in or on the inner wall of the outer casing.

Depending on the dimensions of the transducer or transducers, the control signal can be used either to measure and control the contamination levels of the solids, enabling the solids purity to be set and the contamination level controlled as the process parameters change, or to measure and control the flow of wash liquid flowing in the casing, whereby to enable the termination of the centrifuge separating cycle once the volume of liquid flow reduces to a required level.

In both cases, overwashing can be eliminated or at least reduced to a minimum using said control signal.

By arranging for the transducer to measure the liquid conductance substantially immediately and to give the appropriate control signal, the overwashing inherent in the methods presently available can be overcome.

Some embodiments of the invention may provide appropriate signals as the liquid mix changes to classify the liquids if the centrifuge is being used to separate more than one liquid. An example of this circumstance is the washing and separation of sugar crystals from molasses wherein it is advantageous to pass the bulk of the molasses separated in the early stages of the cycle to one tank and, shortly after the commencement of washing to deflect the combination of molasses and wash liquid flow to another tank.

Preferably, the transducer comprises at least two electrical conducting strips/shapes (electrodes) separated by a distance by an electrical insulating substance (insulator). A voltage is applied across the electrodes of the transducer establishing an electric current through any liquid flowing down the casing over the surface of the transducer and hence gaining a measure of the conductance of the wash liquid covering the transducer.

The value of the conductance of the wash liquid may be interpreted in any of a plurality of methods depending upon the dimensions of the transducer, specifically the size of the insulator separating the electrodes and the arrangement and shape of the electrodes and the calibration settings.

Within the limits set by the transducer dimensions, the relationship between the electrical conductance of the liquid measured and depth of a liquid of constant conductance is for practical purposes proportional to the amount of liquid flowing down the inner casing. This attribute is particularly advantageous when, at the accepted economic minimum flow of the wash liquid, the reduction in centrifuge utilization in continuing the process cycle is greater than the advantage of further liquid separation. At this point the transducer can signal the end of the centrifuge cycle. An example of this situation (hereinafter referred to as Class Z) is in the separation of water from fabrics.

Within other limits set by the transducer dimensions, the relationship between the measurement of the electrical conductance of the wash liquid and the levels of contamination (organic salts, chloride salts, and other solids conductive in solution) is also, for practical purposes, proportional. This attribute is advantageous in Classes X and Y processes.

In some embodiments of the invention the transducer comprises at least two electrodes set in an electrically insulating material. If there are more than two electrodes, they can be connected alternately.

The arrangement of the electrodes may be parallel, trapezoidal, circular or any other patterns as long as an electrically insulating material is between the adjacent electrodes.

In some embodiments of the invention the electrodes are connected via connections in an electrical circuit using a proprietary alternating current bridge circuit or another form of electronic controller. The electronic controller measures the applied voltage across the electrodes in the transducer and the amount of current flow through the liquid covering the electrodes in the transducer. The electronic controller then generates an output relating to the electrical conductance of the liquid, with facilities to preset the level and range at which the electronic controller generates an output to either control the degree of contamination or the flow of the liquid.

In some embodiments of the invention, a small auxiliary wash pipe may be attached to clean the surplus liquid off the transducer surfaces and to facilitate calibrations.

In some embodiments of the invention, a temperature sensing device may be provided to measure the temperature of the liquid and send a signal to the electronic controller to adjust the generated output accordingly.

In some embodiments of the invention, the electrodes in the transducer may have non-parallel sides to increase the range for which the relationship between the conductance measured via the transducer and the depth of the liquid flowing over the transducer is proportional.

In some embodiments of the invention, the connections from the transducer to the electronic controller may be re-adjustable externally at the centrifuge to allow the increase or decrease in the amount of electrically insulating material (i.e., alter the values of 't') which has an effect upon the electronic controller's output.

One feature of this invention is thus to give an immediate signal to limit the wash volume to the minimum needed to achieve the required solids purity that adjusts automatically to the variations in the process parameters. A second feature of some embodiments is to provide a control signal when the solids contamination has been reduced sufficiently so that the centrifuge wash cycle can be terminated. A third feature of some embodiments is to provide a control signal proportional to the volume of liquid (of constant conductivity) flowing through the casing of a centrifuge—the signal terminating the centrifuge separating cycle as soon as the liquid flow reduces to the required level. A fourth feature of some embodiments, when more than one liquid is being separated in a centrifuge, is to give the appropriate signals as the liquid mix changes to classify the liquids. For example in the Class X process for sugar separation it is advantageous to pass the bulk of the molasses separated in the early stages of the cycle to one tank and, shortly after the commencement of washing, to deflect the mixed molasses/wash liquid flow to another tank.

DESCRIPTION OF THE DRAWINGS

The invention is described further hereinafter, by way of example only, with reference to the accompanying drawings, in which.

DESCRIPTION OF THE INVENTION

Figure 1:
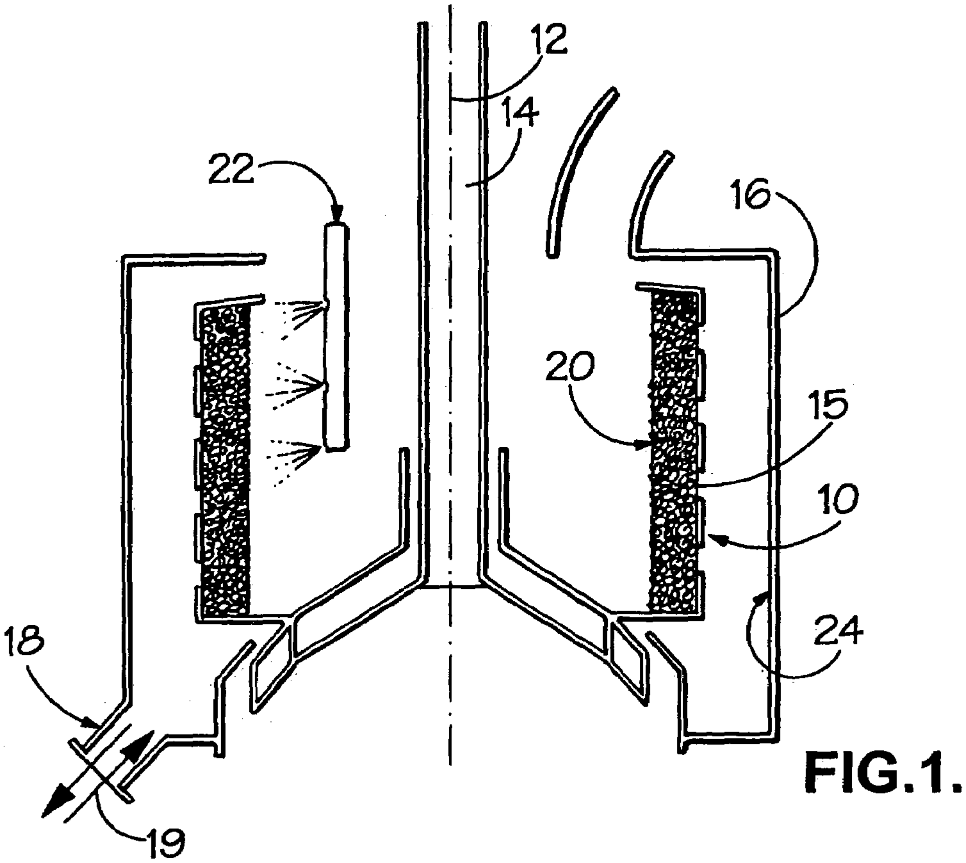
FIG. 1 is a diagrammatic cross-section through a typical known centrifuge structure to which the present invention may be applied.
Figure 2:
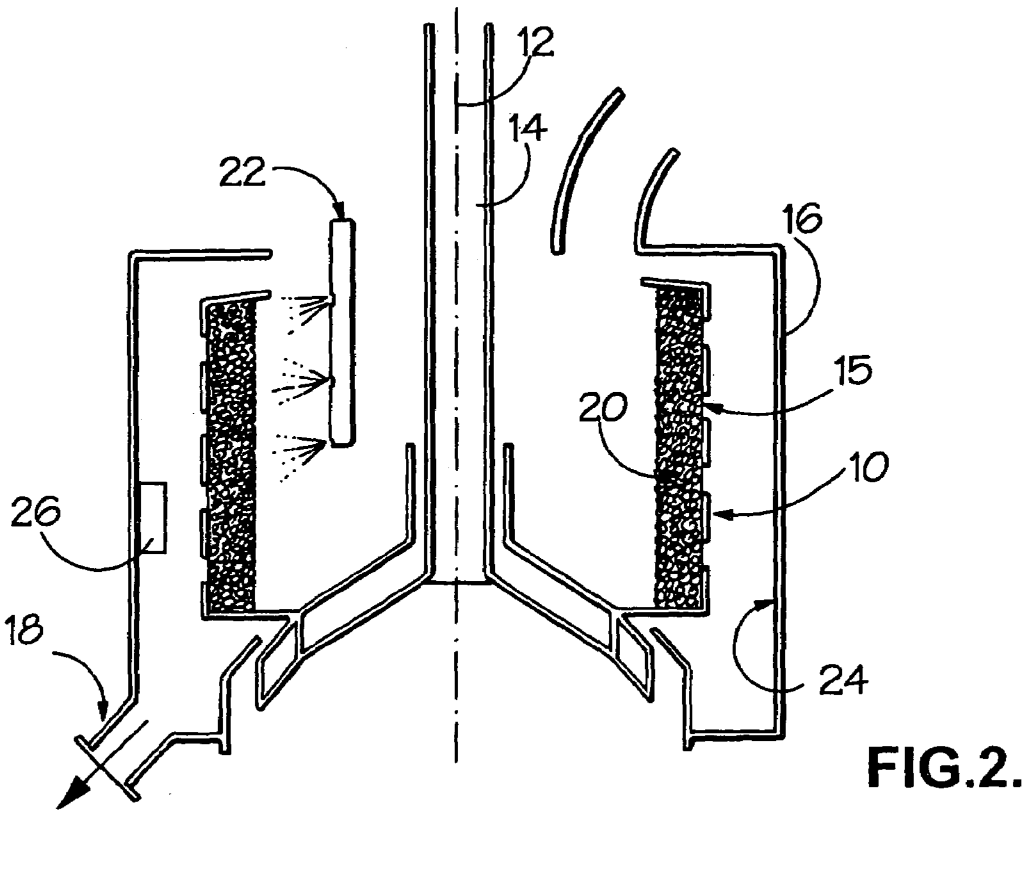
FIG. 2 is a diagrammatic cross-section of the centrifuge structure of FIG. 1 modified in accordance with a first embodiment of the present invention.

FIG. 2 shows the centrifuge of FIG. 1 but with a sensor 26 shown at a position on the inner cylindrical wall 24 of the centrifuge casing 16 to provide a control signal on the state of the wash liquid as it impinges on the inner surface of the casing for monitoring and enabling immediate control of the liquid flowing through the centrifuge.

Figure 3:
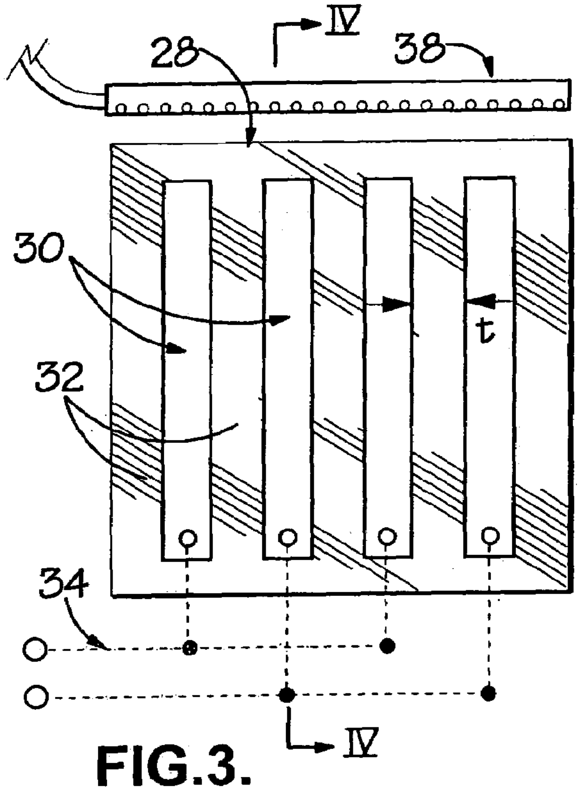
FIG. 3 is a diagrammatic front view of a transducer with parallel electrodes, which may be used in accordance within the present invention.
Figure 4:
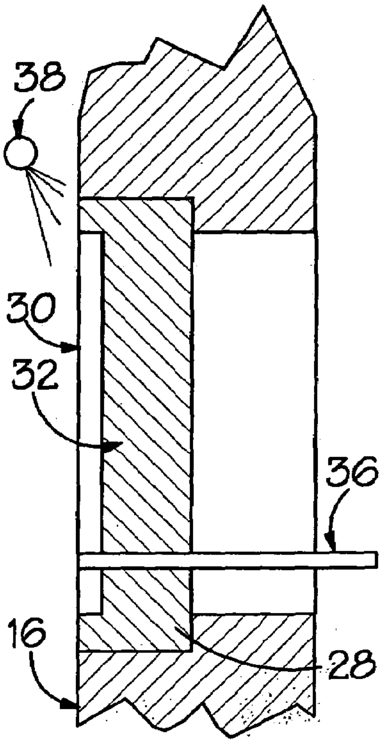
FIG. 4 is a sectional view of the transducer of FIG. 3 on the line IV—IV.

In the embodiment of FIGS. 3 and 4, the transducer 28 is flush mounted on the inside wall of the casing 16 such as to maintain a near cylindrical inner surface of the casing and to intercept the liquid flow immediately it leaves the basket perforations to measure its conductance. The preferred form of transducer has two or more electrically conductive strips/electrodes 30 set in an electrical insulating substrate 32 and, if more than two, connected alternately, or to a predetermined pattern 34, as inducted by the dotted lines in FIG. 3.

The arrangement and shape of the strips can be parallel, trapezoidal, arcuate or any other, pattern so long as the insulated distance "t" exists between adjacent strips.

Figure 5:
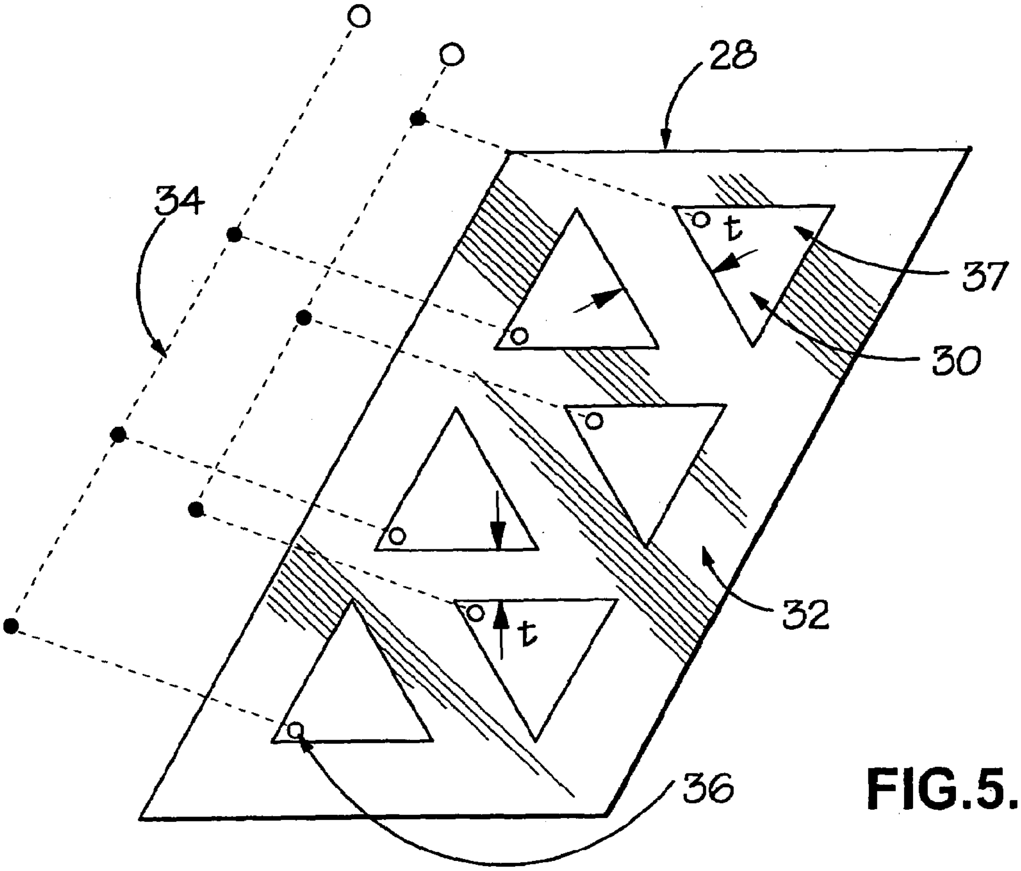
FIGS. 5 and 6 are diagrammatical representations of transducers with possible regular arrangements of electrodes, which may be used in accordance within the present invention.
Figure 6:
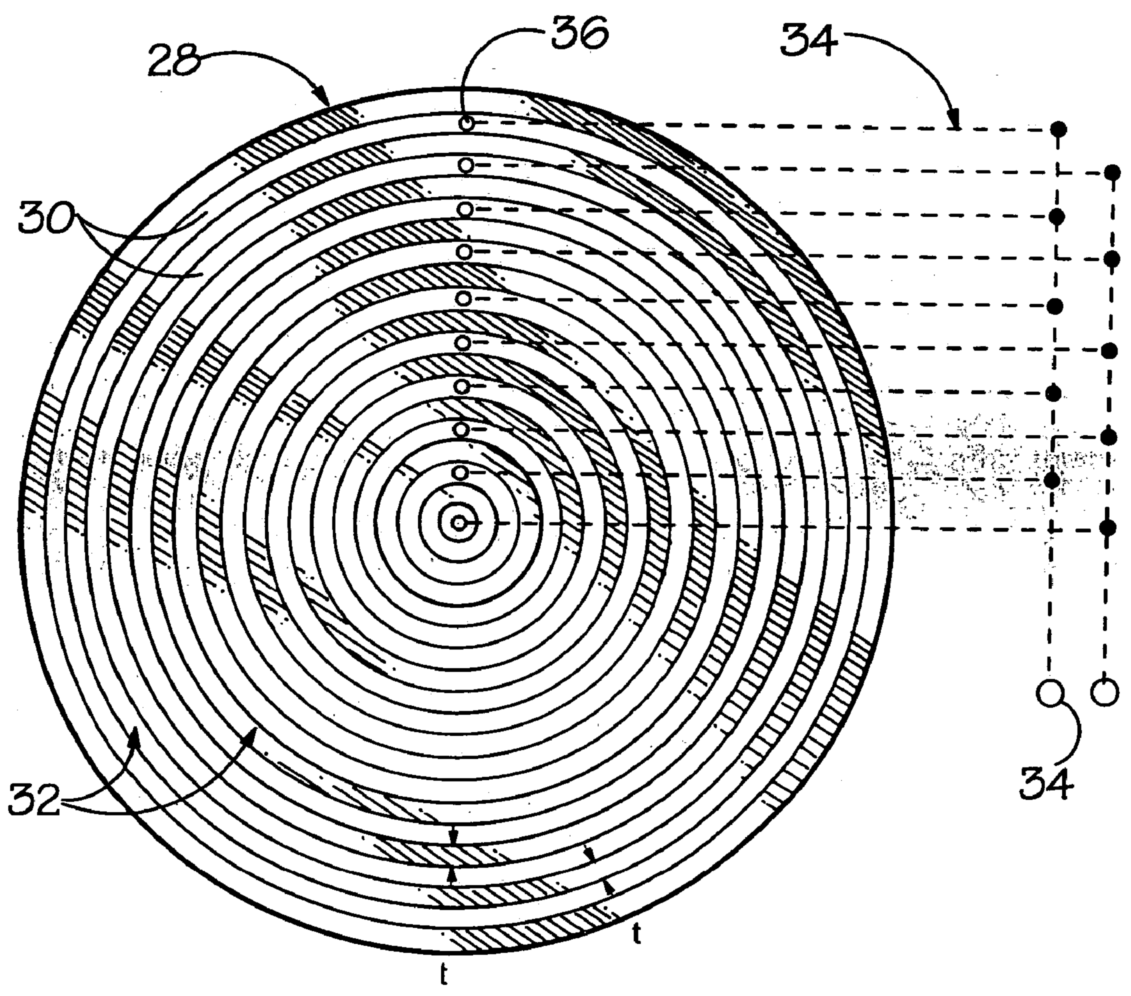

In alternative forms of the transducer two or more shapes 37, which can be rectangular, triangular, arcuate, spiral etc., mounted in a pattern on a substrate with the insulated distance "t" defined between end shape. FIG. 5 shows such a device using triangular shapes and FIG. 6 with arcuate shapes. The shapes/strips are connected via connections 36 in an electrical circuit using a proprietary A.C. bridge circuit or other electric controller.

For less viscous liquids, the depth when flowing down the inside of the casing 24 may vary from place to place, with local disturbances in the liquid being created by irregularities in liquid discharge, windage, vibration, etc. A transducer covering too small an area would then give a misleading local value of conductance rather than the required mean or average reading required for liquid depth measurement. To overcome this, the active area of the transducer is set to cover several irregularities so that the conductance measured is the mean value.

For vertical spindle centrifuges of the type shown in FIG. 2, a rectangular or irregular shaped transducer is used with its narrow width set circumferentially in the inside of the casing and its long side set at or near vertical—extending lengthwise over a sufficient portion of the casing height to cover any liquid flow irregularities down the casing. An alternative arrangement of a series of small transducers set one above the other and connected in parallel over an area similar to that of the single rectangular transducer would also give the mean conductance value.

For horizontal spindle centrifuges, not illustrated, a rectangular transducer would be set with its long side, as a circumferential arc, around the inside of the casing extending over a sufficient portion of the casing circumference to cover any liquid flow irregularities and with its narrow side set at or near horizontal. Again, an alternative arrangement with a series of small transducers in the form of an arc and connected in parallel over an area similar to that of the single rectangular transducer would also give the mean conductance value.

For inclined spindle centrifuges, not illustrated, a combination of the vertical and horizontal arrangements above may be applied, with the preferred arrangement being a single rectangular (or a series of small transducers) set in a spiral arc in the inside of the casing.

The controller measures the voltage V applied to and current A passing through the liquid flowing down the casing and over the surface of the transducer, with facilities to preset the levels and ranges at which the bridge/electronic circuit operates and gives output signals to control contaminant or liquid flow.

Using a suitably dimensioned transducer, the value of A/V may be used in Classes X and Y situations to measure and control the degree of contamination of the liquid flowing over the transducer as the electric conductance A/V measured at the transducer corresponds to an equivalent contamination level. A typical relationship between conductivity and levels of contamination (organic salts, chloride salts, and other solids conductive in solution), applicable to Classes X and Y, is shown in graph A of FIG. 11.

In other embodiments, the value of A/V may be used to measure and control the depth of liquid of constant conductivity flowing over a suitably dimensioned transducer (Class Z). An example of a process in which depth measured is advantageous is the termination of liquid flow from a centrifuge. At the accepted minimum flow, the reduction in centrifuge utilization in continuing the process cycle is greater than the advantage of further liquid separation. At this point, the transducer A/V depth signal proportional to the flow of liquid in the machine casing, signals the end of the centrifuge cycle. An example of Class Z is the centrifugal separation of water from fabrics.

The transducer dimensions, and particularly the spacing "t" between the electrodes, is matched to the application. Generally, the spacing will be closer when used for Classes X and Y and wider for Class Z.

Returning now to FIGS. 3 and 4, a small auxiliary wash pipe (38) may be fitted in the casing to clean the surface of the transducer and to recalibrate it as necessary. If the process temperature varies, a temperature sensing device is fitted to measure the wash liquid temperature and, if required, apply a signal to the bridge/electronic controller to adjust the preset conductance levels.

Figure 7:
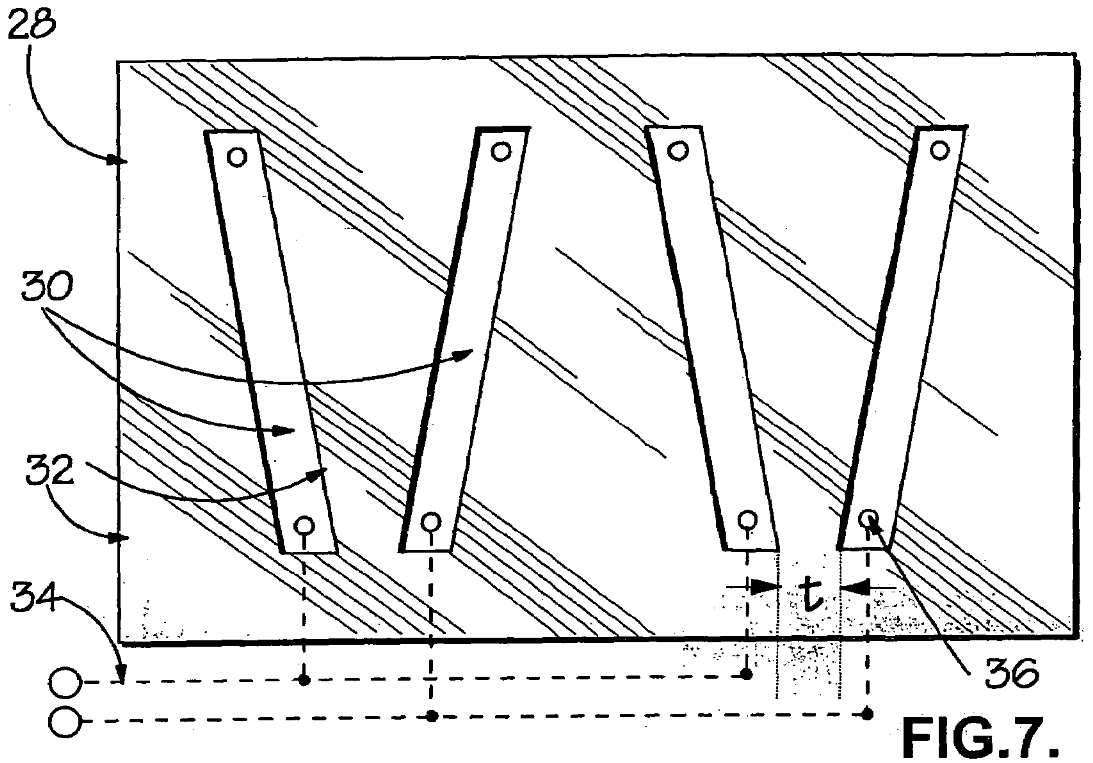
FIGS. 7, 8 and 9 are diagrammatical representations of possible embodiments of transducers with nonparallel electrodes, which may be used in accordance within the present invention.
Figure 8:
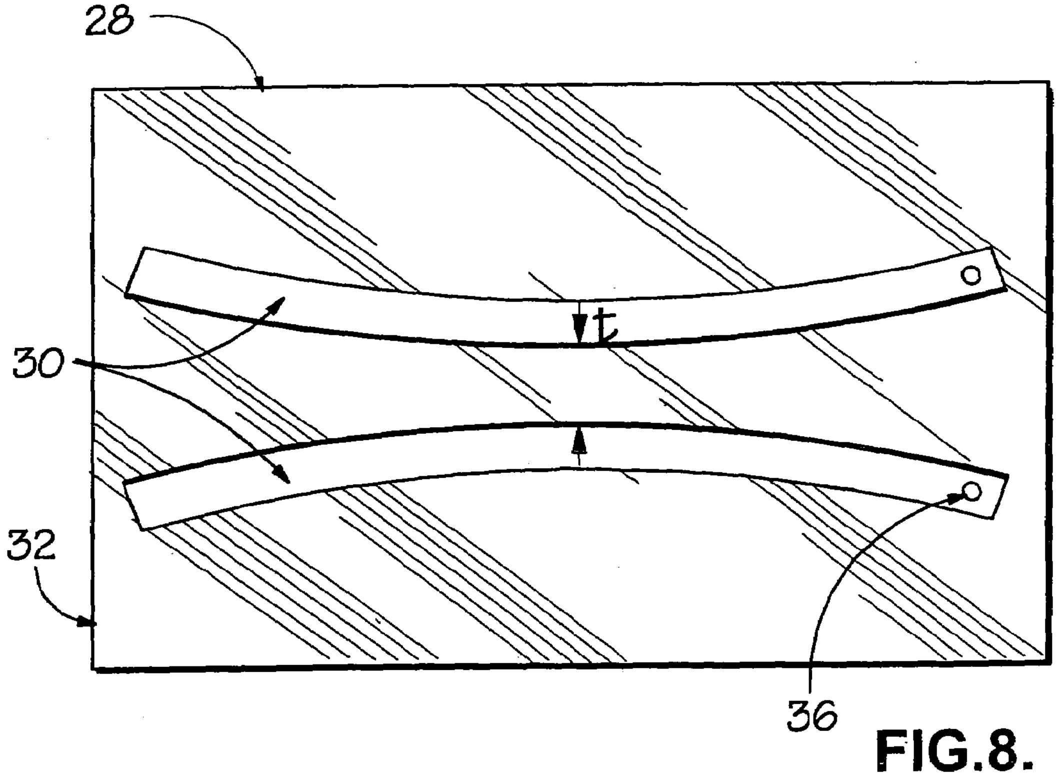
Figure 9:
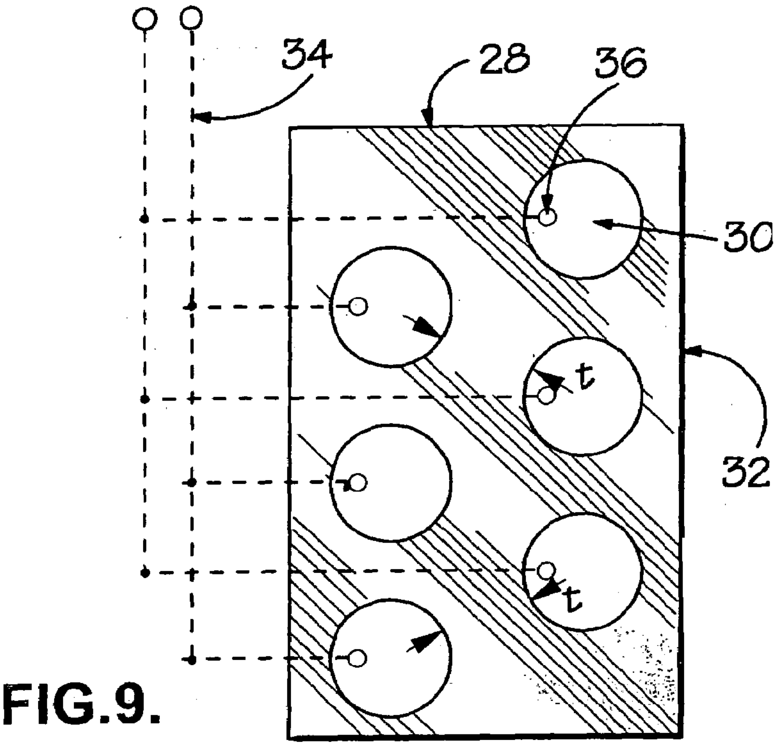

In another arrangement, the transducer device uses strips or shapes that have non parallel sides so that the insulating substrates separating adjacent strips or shapes are tapered or curved, examples of which are shown in FIGS. 7, 8 and 9. This increases the range over which "d/t" is near linear as shown by line "g.h." on Graph C (FIG. 13) which compares the Graph B parallel electrode results with angled electrodes to increase the control range for some Class Z applications.

Figure 10:
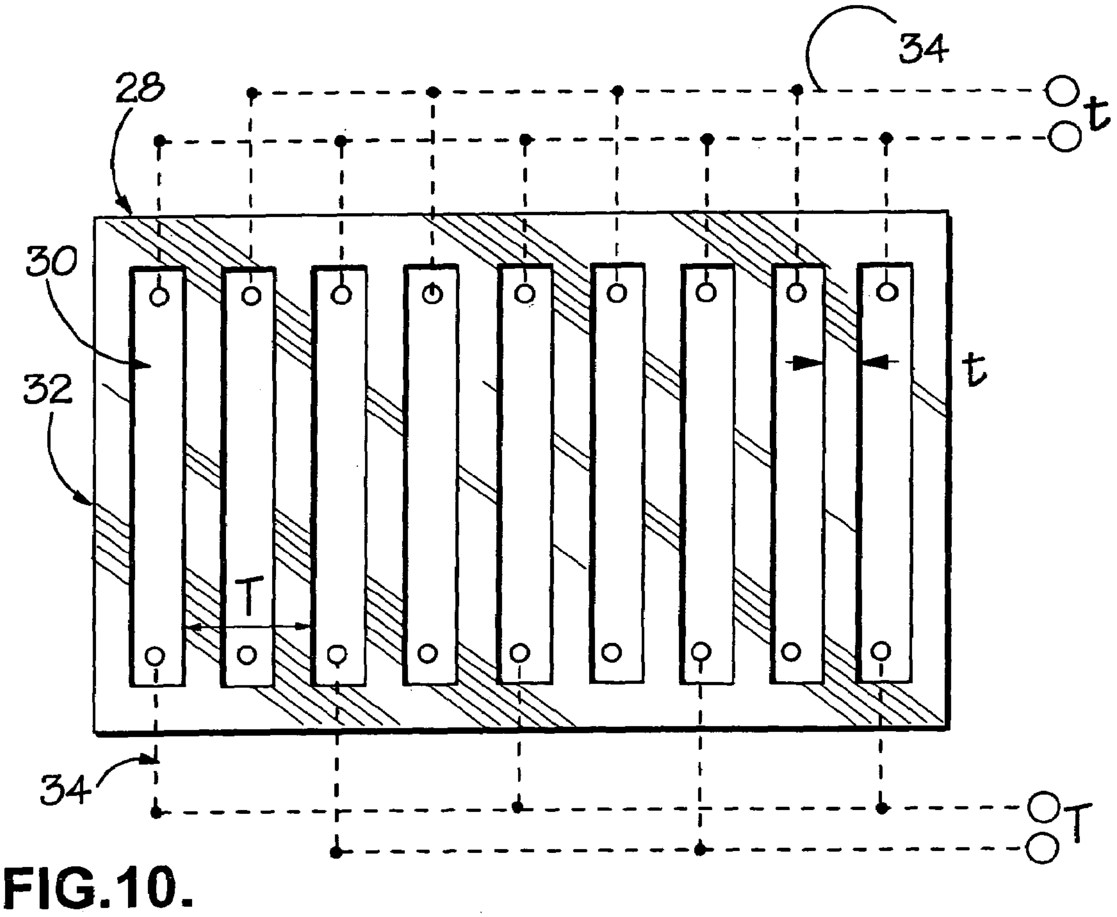
FIG. 10 is a diagrammatical representation of a possible embodiment of the transducer which allows the operator to alter the effective distance between the electrodes, which may be used in accordance within the present invention.

In an alternative embodiment of the invention the connections from the transducer to the electronic controller may be re-adjustable externally at the centrifuge to allow the increase/decrease in the amount of electrically insulating material (i.e., alter the values of "t") which has an effect upon the electronic controller's output, as generally indicated in FIG. 10 which shows alternative connections for operating at electrode spacings of "t" and "T".

Figure 11:
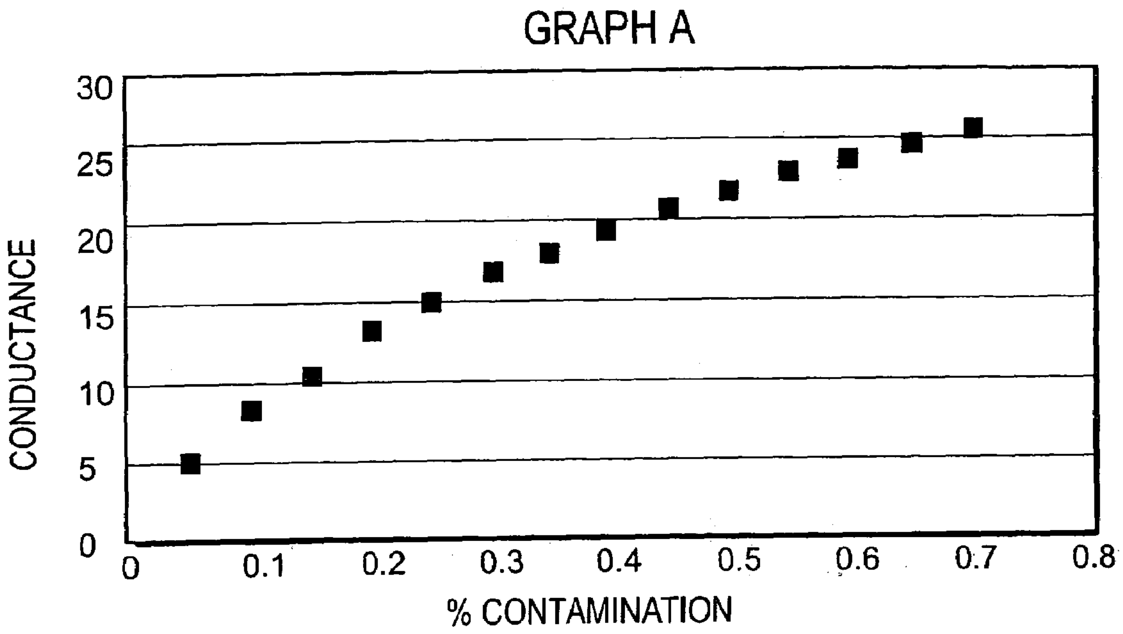
FIG. 11 is a graph which displays experimental results, comparing contamination levels with the electrical conductivity of the wash liquid.
Figure 12:
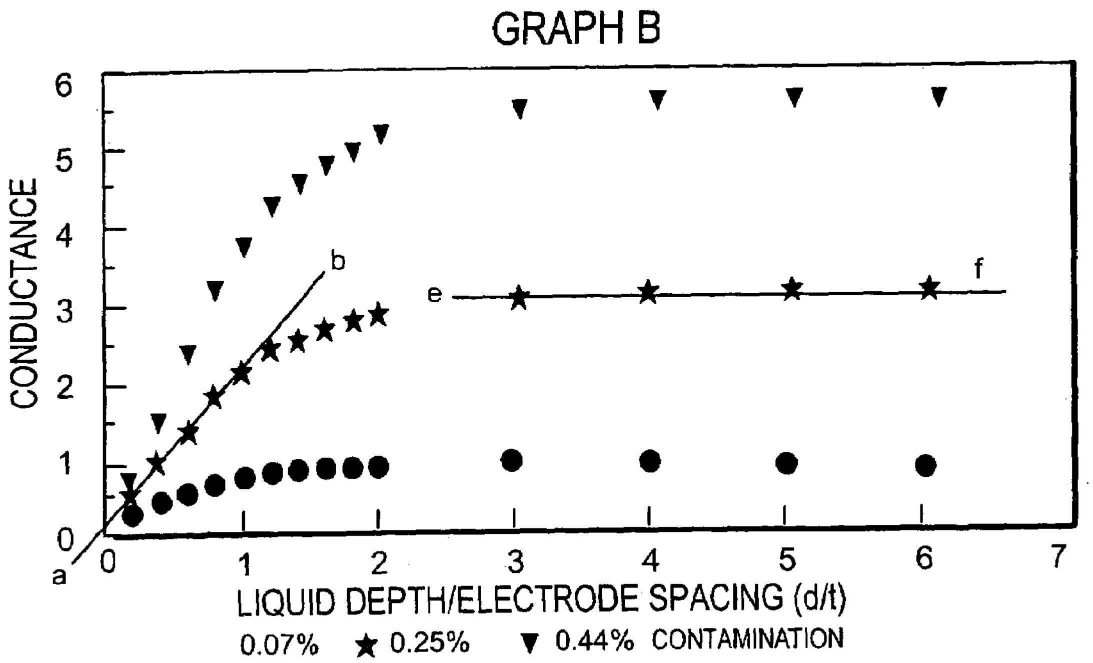
FIG. 12 is a graph which displays experimental results comparing the ratio of the depth of the wash liquid divided by the electrode spacing with the electrical conductance of the wash liquid and showing the areas in which the conductance measured is proportional to contamination and, alternatively, proportional to the depth of liquid.
Figure 13:
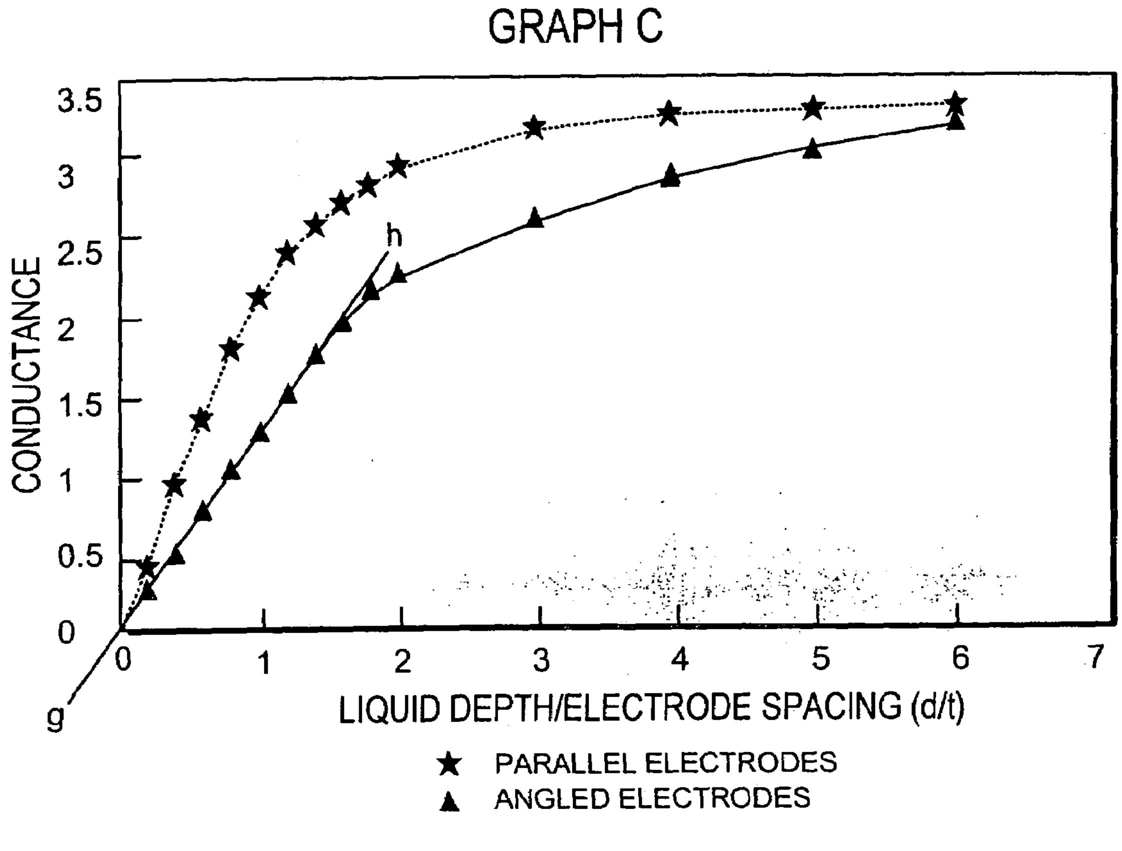
FIG. 13 is a graph which displays experimental results using a transducer with differently shaped electrodes, comparing the ratio of the depth of the wash liquid divided by the electrode spacing with the electrical conductance of the wash liquid and then comparing parallel and non-parallel (angled) electrodes to demonstrate the advantage of angled electrodes in Class Z processes.

The graphs of FIGS. 11, 12 and 13 show various experimental results applicable to the present invention.

Graph A of FIG. 11 shows a typical relationship between the conductivity of the wash liquid and the level of contaminates (organic salts, chloride salts, and other solids conducive in a solution) in the wash liquid.

A series of experimental results is given in Graph B of FIG. 12 showing for parallel electrodes the relationship between the electrical conductance measured via the transducer and the ratio of liquid depth "d" flowing over the transducer divided by the electrode spacing "t" for various contamination levels. This indicates that for values of "d/t" from zero to one the relationship between liquid depth and the electrical conductance measured via the transducer is for practical purposes linear (as indicated by line ab.) In these circumstances the transducer signal is proportional to the thickness of the wash liquid flowing over the transducer and therefore proportional to the quantity of liquid flowing down the inner casing. An electrode spacing "t" greater than the value of "d" that corresponds to this maximum flow rate may be used; typically two to five times "d".

The experimental results in Graph B also show that for values of "d/t" greater than four the conductance measured via the transducer is independent of the liquid depth and proportional to the level of contamination only (as indicated by line ef.) The electrode spacing "t" used may be less than a quarter of the minimum value of "d", typically 0.2 to 0.05 times "d".

Graph C of FIG. 13 demonstrates that it is possible to increase the control range for some applications by implementing electrodes which have nonparallel sides such that the insulating substrate separating adjacent strips or shapes are tapered or curved (examples of which are shown in FIGS. 7, 8 and 9). The range over which "d/t" is near linear as shown by line gh compares favorably with the results taken from Graph B where the electrodes are parallel, hence demonstrating the increase in the control range for Class Z applications.

Thus, the present invention, used as described above, in one form makes a near instantaneous measure of the condition of solids rotating in a centrifuge and, when the required condition is reached, signals the process to proceed without overwashing losses and without delay. In another form the apparatus signals the optimum minimum level of liquid flow from a centrifuge for the process to proceed immediately. Both forms compensate automatically for changing process parameters, avoiding the need for manual intervention to adjust for process parameter changes.

Thus, an apparatus in accordance with the invention can be free of the limitations inherent in the state of the art methods of overwashing and applies to all methods of using the transducer as described herein to control liquid flows.

The invention claimed is:

1. An apparatus for the separation of solids and liquids comprising:

a perforated basket which is mounted rotatably within a fixed outer casing, said perforated basket having a perforated outer surface through which liquids are centrifugally expelled from the basket, said fixed outer casing having an inner surface that faces the perforated outer surface of the perforated basket and receives the liquids centrifugally expelled from the basket, a washing liquid supply means for providing washing liquid to the basket and its contents, and a transducer for establishing a control signal representative of the state of liquids centrifugally expelled from the basket, the transducer located in or on the inner surface of said fixed outer casing for monitoring the conductance of the liquids centrifugally expelled from the basket when such liquids impinge on and flow down the inner surface of said fixed outer casing, said transducer comprising at least two electrodes set in an electrically insulating material and having a distance therebetween.

2. An apparatus according to claim 1, wherein said inner wall of the outer casing is cylindrical and said transducer is itself at least part cylindrical.

3. An apparatus according to claim 1, wherein said inner wall of the outer casing is cylindrical and said transducer is itself at least part cylindrical.

4. An apparatus according to claim 1, wherein the transducer comprises electrodes coupled to one of an AC bridge and other form of electronic controller.

5. An apparatus according to claim 4, wherein the transducer comprises electrodes which have no adjacent parallel sides whereby to increase the range for which the proportional relationship between the conductance measured via the transducer and the depth of the liquid flowing over the transducer is increased.

6. An apparatus according to claim 5, wherein the connections from the transducer to the AC bridge or the electronic controller are re-adjustable externally to allow the effective increase/decrease in the amount of electrically insulating material between the electrodes.

7. An apparatus according to claim 1, further comprising:

an auxiliary wash pipe for cleaning the surfaces of the transducer and to facilitate calibrations.

8. An apparatus according to claim 1, further comprising:

a temperature sensing device to measure the temperature of the liquid and send a signal to adjust the generated output accordingly.

9. An apparatus according to claim 1, wherein the liquids flowing down the inner surface of said fixed outer casing have a maximum radial thickness of d, wherein the distance between the at least two electrodes is a distance t, wherein $t<d$, and wherein the control signal established by the transducer is representative of the percentage contamination of the liquids.

10. An apparatus according to claim 1, wherein the liquids flowing down the inner surface of said fixed outer casing have a maximum radial thickness of d, wherein the distance between the at least two electrodes is a distance t, wherein t>d, and wherein the control signal established by the transducer is representative of a radial thickness of the liquids.

11. An apparatus according to claim 1, wherein the liquids flowing down the inner surface of said fixed outer casing have a maximum radial thickness of d, wherein the transducer comprises at least two electrodes separated by a distance t where t<d in order to establish a control signal that is representative of the percentage contamination of the liquids, and wherein the transducer comprises at least two electrodes separated by a distance T where T>d in order to establish a control signal that is representative of the radial thickness of the liquids.

12. An apparatus according to claim 11 wherein the at least two electrodes separated by a distance t and the at least two electrodes separated by a distance T are externally selectable via alternative connections.

* * * * *